TIME DIVISION MULTIPLEX TELEGRAPH MESSAGE SWITCHING CENTER EMPLOYING TIME SLOT MULTIPLICATION

Original Filed April 23, 1964

INVENTOR.
BARRIE BRIGHTMAN
DAVID S. J. SMITH

BY George J. Seligsohn

ATTORNEY

United States Patent Office 3,379,836

Patented Apr. 23, 1968

3,379,836

TIME DIVISION MULTIPLEX TELEGRAPH MESSAGE SWITCHING CENTER EMPLOYING TIME SLOT MULTIPLICATION

Barrie Brightman, Webster, and David S. J. Smith, Ontario, N.Y., assignors to General Dynamics Corporation, a corporation of Delaware Continuation of application Ser. No. 361,954, Apr. 23, 1964. This application Apr. 18, 1967, Ser. No. 631,840
8 Claims. (Cl. 178—50)

ABSTRACT OF THE DISCLOSURE

In a switching system for applying a stored message to a plurality of outgoing lines during a single readout, the system including a first time division multiplex highway link between a magnetic storage drum and individual ones of a plurality of bistable devices. Each bistable device successively receiving a single bit from an individual readout message during each time frame. The system also includes a second time-divided multiplex highway link which connects the output of the bistable devices to the outgoing lines, so that by selecting different outgoing lines in different time slots, the output of a bistable device during various time slots of an individual message may be extended to more than one outgoing line.

This is a continuation of application Ser. No. 361,954, filed Apr. 23, 1964 and now abandoned.

This invention relates to time slot multiplication and, more particularly, to a time division multiplex telegraph message switching center employing such time slot multiplication.

In a telegraph or teletype message switching center, a message received over an incoming line is selectively retransmitted over one or more particular ones of a plurality of outgoing lies in accordance with address information included at the beginning of a received message. Since a particular outgoing line may be busy with another message at the time an incoming message addressed thereto is received, it is the practice in message switching centers to provide buffer storage for incoming messages, utilizing such means as a magnetic drum, for instance. Furthermore, since the rate at which the bits composing an incoming message are received over an incoming line and the bits composing an outgoing message are retransmitted over an outgoing line is much slower than the rate at which the switches of the message switching center may be operated, it is the present practice to utilize time division multiplex techniques for handling the various messages within the message switching center.

More specifically, when a multitrack magnetic drum is utilized as a message store, each track utilized to store messages is divided into a plurality of separate sectors, each sector being further divided into a number of separate slots equal to the maximum number of individual messages which may be stored on that track. Thus, the first bit of a first message would be stored on the first slot of the first sector of a given track, the first bit of a second message on the second slot of the first sector of the given track, etc., and the second bit of the first message would be stored on the first slot of the second sector of the given track, the second bit of the second message would be stored on the second slot of the second sector of the given track, etc. Therefore, the bits of the various messages are stored in interlaced relationship on each particular message storage track of the magnetic drum, so that during the time it takes the magnetic drum to rotate through one complete sector with respect to a read head associated with a given message store track a single bit from each of the messages stored on the given track will be successively read out by the read head. This time is defined as a time frame, while the individual portion of each successive time frame taken to read out the bits composing each different one of the messages stored on the given track is defined as a separate time slot. Thus if there are N messages stored on a given track, there will be N time slots per time frame.

Utilizing well known time division multiplex techniques, it is a relatively simple matter to associate various individual messages with various individual preselected outgoing lines on a one-to-one correspondence basis. More particularly, the read head corresponding to each track has associated therewith a normally closed store gate and each outgoing line has associated therewith a normally closed line gate. A common highway interconnects the output of all the store gates with the input of all the line gates. By simultaneously opening any selected single one of the store gates and any selected single one of the line gates during a particular time slot of successive time frames, only a particular one of the stored messages will be applied to the outgoing line corresponding to the selected single one of the line gates. In a similar manner, other time slots may be utilized to apply other messages to other selected outgoing lines.

Although usually a given message is to be sent to only a single destination, there are many cases where a single message is to be sent to a plurality of destinations, each of which is reached over a different outgoing line. This situation occurs, for instance, when a news service wishes to transmit the same message to many newspapers located all over the country.

So long as it is desired to transmit a given message to only a single destination, the time division multiplex technique outlined above is very effective. However, as pointed out, one of the limitations on this present day time division multiplex technique is that it can only apply various messages to various outgoing lines on a one-to-one correspondence basis, i.e., although any given message may be associated with any given outgoing line, it can be associated only with a single selected outgoing line. Therefore it is not effective in applying a given message to a group of outgoing lines during a single reading of the message, so that a given message may be substantially simultaneously transmitted to a plurality of different destinations. Thus, utilizing present techniques, it is necessary to provide repeated message readouts from the drum, one for each different destination, which is time consuming and inefficient.

The present invention contemplates overcoming this problem by employing time slot multiplication. Briefly, this is accomplished by utilizing a first time division multiplex transmission highway for interconnecting each message being read out during successive time frames to a separate one of a plurality of bistable devices, each of which is capable of storing a single bit from a single message for one time frame. A second time division multiplex highway is utilized to interconnect any one of the bistable devices during one or more time slots of a time frame to one or more preselected outgoing lines.

It is therefore an object of the present invention to provide time slot multiplication in a telegraph message switching center.

It is a more specific object of the invention to provide apparatus for applying the individual binary bits of a group of N messages stored in time division multiplex form to any predetermined number of preselected outgoing lines.

These and other objects, features and advantages of the present invention will become apparent from the following detailed description, taken together with the accompanying drawing, in which.

Figures 1, 2:
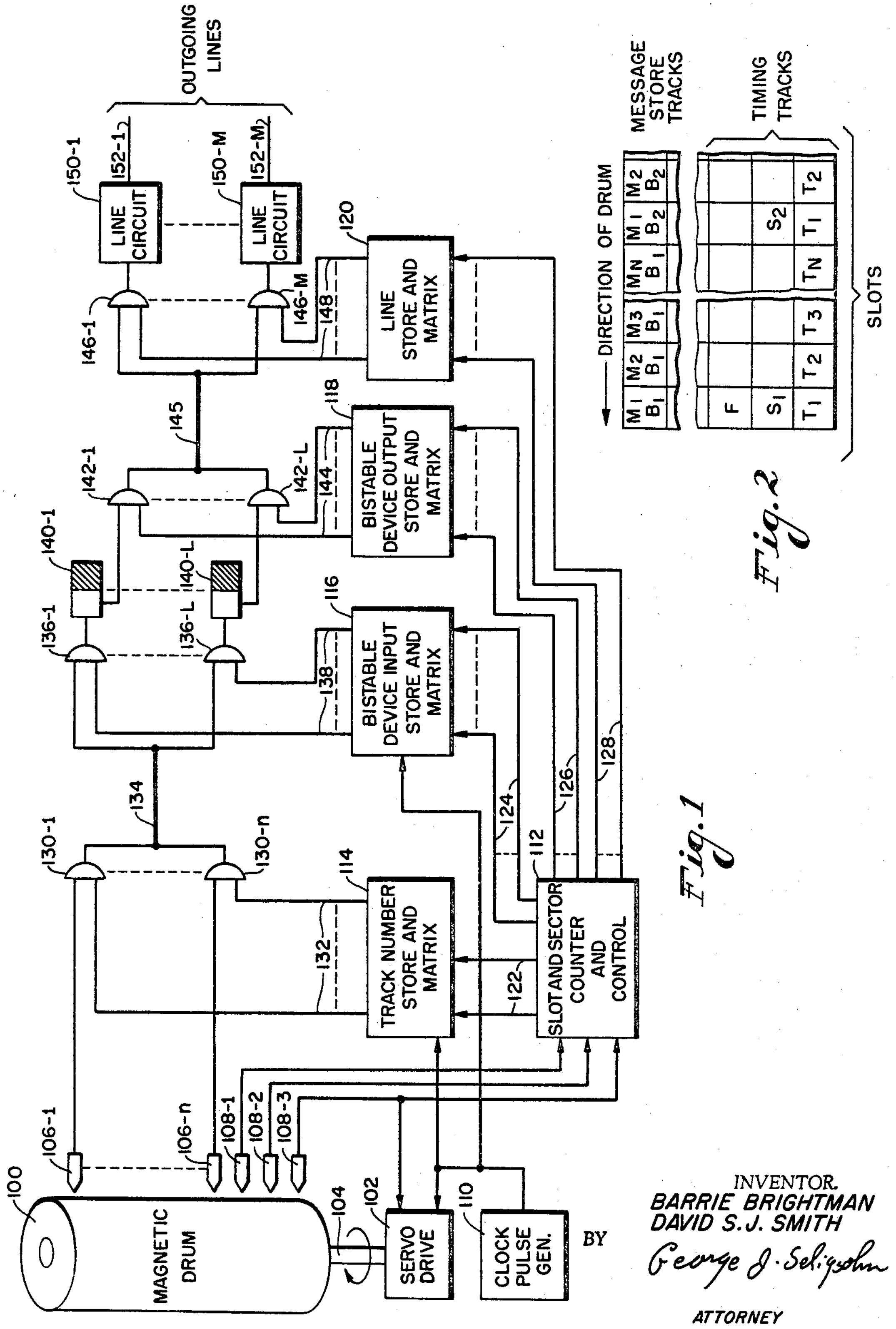
FIG. 1 is a generalized preferred embodiment of the present invention.
FIG. 2 is a diagram showing the manner in which information is stored on the surface of the magnetic drum utilized in the embodiment shown in FIG. 1.

Referring now to FIG. 1, there is shown a magnetic drum 100 which is rotated by means of servo drive 102 coupled to drum 100 by shaft 104.

Magnetic drum 100 includes *n* message store tracks and three timing tracks. As shown in FIG. 2, each of the tracks is divided into a plurality of slots. Each slot of each track may be separately magnetized in either one of two opposite directions to record individual bits of information thereon. As shown, each message store track, which are all similar to each other, has the first binary bit of the first of N messages stored thereon occupying a particular slot, which will be called the "first" slot. The first binary bit of the second of the N messages is stored on the "second" slot of that track. The first binary bit of the third of the N messages is stored on the "third" slot of that track, etc., so that the first binary bit of the Nth message is stored on the N slot of that track. Then the second binary bit of the first message is stored on the "$N+1$" slot of that track, the second bit of the second message is stored on the "$N+2$" slot of that track, etc. Although not shown, it will be seen that the second binary bit of the Nth message will be stored on the 2N slot of that track and that the third, fourth, . . . binary bits of the first message will be stored, respectively, on the "$2N+1$," "$3N+1$," . . . slots of that track, the third, fourth, . . . binary bits of the second message will be stored, respectively, on the "$2N+2$," "$3N+2$," . . . slots of that track, etc.

As further shown in FIG. 2, the first of the three timing tracks has a fiducial mark permanently recorded only on the so-called "first" slot, which fiducial mark is designated by F. The second of the three timing tracks has a sector mark permanently recorded on each of the "first," "$N+1$," . . . slots, which sector marks are designated $S_1$, $S_2$, . . . . The third of the three timing tracks has a timing mark permanently recorded on each and every slot, the timing marks recorded within each sector being designated by $T_1$, $T_2$, $T_3$, . . . $T_N$.

Returning now to FIG. 1, each of the message store tracks has associated therewith an individual read head, namely, read heads 106–1 . . . **106–*n*, and each of the three timing tracks has associated therewith an individual read head, namely, read heads 108–1, 108–2 and 108–3**.

In response to each slot of the third timing track of magnetic drum 100 rotating past read head 108–3, read head 108–3 will produce successive individual pulses. These pulses from read head 108–3 are applied, as shown, as the first input to servo drum 102. Pulses from clock pulse generator 110 are applied, as shown, as the second input to servo drive 102. Servo drive 102 includes means for comparing the time of occurrence of each pulse from read head 108–3 and from clock pulse generator 110 and then controlling the speed of rotation of magnetic drum 100 to maintain the pulses from read head 108–3 and from clock pulse generator 110 in time coincidence. No further description of the details of servo drive 102 will be given herein, since it forms no part of the invention and is well known to those skilled in the art.

The outputs of each of read heads 108–1, 108–2 and 108–3 associated, respectively, with each of the three timing tracks of magnetic drum 100 are applied as individual inputs to slot and sector counter and control 112.

Slot and sector counter and control 112 includes a first counter, having a count capacity of at least N, for counting the slot pulses from read head 108–3, which first counter is reset in response to each sector pulse from read head 108–2; a second counter, having a count capacity at least equal to the total number of sectors, for counting the sector pulses from read head 108–2, which second counter is reset in response to each fiducial pulse from read head 108–1. Therefore the exact angular position of drum 100 is manifested by the counts of the first and second counters.

Each of track number store and matrix 114, bistable device input store and matrix 116, bistable device output store and matrix 118, and line store and matrix 120 may consist of a plurality of recirculating delay lines each providing a delay equal to one time frame, i.e., the time taken by magnetic drum 100 to rotate through one sector. It will be seen that if each order of a binary coded number is applied as an input to a different delay line of such a store during any given time slot of a time frame, the binary coded number will appear at the output of the delay lines during this same given time slot of the next time frame. Now, if this binary coded number is then recirculated, it will continue to appear at the output of the delay line in the same given time slot during each successive time frame. Also, different binary coded numbers may be applied in different time slots, so that during each time frame each of these binary coded numbers will sequentially appear at the output of the delay lines. A matrix having a plurality of output conductors and having an input coupled to the output of the recirculating delay lines will produce a mark on a separate single one of its output conductors in response to each different binary coded number.

Thus, each of track number store and matrix 114, bistable device input store and matrix 116, bistable device output store and matrix 118, and line store and matrix 120 is capable of applying a mark to any one of its output conductors during any given time slot of successive time frames in response to a binary coded number designating that output conductor being applied as an input to that store in that time slot.

Slot and sector counter and control 112 include means, the details of which form no part of the present invention and which are well known in the prior art, for applying to the delay line inputs of track number store and matrix 114 a binary coded number designating any particular one of the message store tracks in any preselected time slot over conductors 122. In a similar manner, slot and sector counter and control 112 applies respective binary coded numbers to the delay line inputs of bistable device input store and matrix 116, bistable device output store and matrix 118, and line store and matrix 120 in any preselected time slot over conductors 124, 126 and 128, respectively.

Clock pulses from clock pulse generator 110 are applied to each of track number store and matrix 114, bistable device input and store matrix 116, bistable device output store and matrix 118, and line store and matrix 120 for synchronizing purposes, in a manner well known in the art.

As shown, the outputs of each of read heads 106–1 . . . **106–*n* associated with the message store tracks of magnetic drum 100 are respectively applied as a first input to each of normally closed AND gates 130–1 . . . 130–*n*, respectively. A second input is applied to each of AND gates 130–1 . . . 130–*n*, respectively, from the matrix output of track number store and matrix 114 over respective ones of conductors 132**, as shown.

The outputs of AND gates 130–1 . . . **130–*n* are multiplied and applied over first common transmission highway 134 as a first input of each of normally closed AND gates 136–1 . . . 136–L. A second input is applied to each of AND gates 136–1 . . . 136–L, respectively, from the matrix output of bistable device input store and matrix 116 over respective ones of conductors 138**, as shown.

The output of each respective one of AND gates 136–1 . . . 136–L is individually applied as an input to a corresponding one of bistable devices 140–1 . . . 140–L to effect the setting thereof in response to the opening of the AND gate corresponding thereto. It will be seen that if a selected one of AND gates 130–1 . . .

130–*n* is opened during the same time slot of successive time frames as a selected one of AND gates 136–1 . . . 136–L, the individual bits composing a particular one of the N messages recorded on the particular message store track corresponding to the selected one of AND gates 130–1 . . . 130–*n* will be sequentially applied during each successive time frame to the input of that bistable device corresponding to the selected one of AND gates 136–1 . . . 136–L. It will be further seen that by making each of the binary coded numbers stored in the various time slots of bistable device input store and matrix 116 unique, different individual messages will be applied to the inputs of the various ones of bistable devices 140–1 . . . 140–L. It is not necessary to make the binary coded numbers stored in track number store and matrix 114 unique. In fact, they may all be identical. In this, case, all of the different messages applied during the successive time frames to the various ones of bistable devices 140–1 . . . 140–L will be derived from the same message store track of magnetic drum 100. However, of course, different messages in different time slots may be derived from different message store tracks of magnetic drum 100 by making the binary coded number stored in track number store and matrix 114 different for different time slots.

Thus, although a bit of a readout message is in cooperative relationship with a particular one of read heads 106–1 . . . 106–*n* for only the duration of a time slot, the application thereof to the input of a particular unique one of bistable devices 140–1 . . . 140–L over the time division multiplex link comprising AND gates 130–1 . . . 130–*n*, highway 134 and AND gates 136–1 . . . 136–L results in each bit of a readout message being statically stored for the duration of an entire time frame.

As further shown in FIG. 1, the output of each of bistable devices 140–1 . . . 140–L is applied as a first input to respective ones of normally closed AND gates 142–1 . . . 142–L. Respective ones of matrix output conductors 144 from bistable device output store and matrix 118 are applied as second inputs to each of AND gates 142–1 . . . 142–L, respectively.

The outputs of AND gates 142–1 . . . 142–L are multipled through common transmission highway 145 and applied to as a first input to each of AND gates 146–1 . . . 146–M. The matrix output of line store and matrix 120 is applied as a second input to each of AND gates 146–1 . . . 146–M over respective ones of conductors 148. The output of each individual one of AND gate 146–1 . . . 146–M is applied to a corresponding line circuit 150–1 . . . 150–M of an individual one of outgoing lines 152–1 . . . 152–M.

It will be seen that if a selected one of AND gates 142–1 . . . 142–L is opened during the same time slot of successive time frames as a selected one of AND gates 146–1 . . . 146–M, the individual bits composing a particular one of the messages stored in a particular one of bistable devices 140–1 . . . 140–L corresponding to the selected one of AND gates 142–1 . . . 142–L will be sequentially applied during each successive time frame to the input of that line circuit of that outgoing line corresponding to the selected one of AND gates 146–1 . . . 146–M. It will be further seen that by making each of the binary coded numbers stored in the various time slots of line store and matrix 120 unique, only a single one of the messages will be applied to each input of the various ones of the line circuits 150–1 . . . 150–M of the outgoing lines 152–1 . . . 152–M. Which particular message is applied to any particular outgoing line is determined by which one of AND gates 142–1 . . . 142–L is opened during the same time slot of successive time frames as that one of AND gates 146–1 . . . 146–M corresponding to that particular outgoing line.

Thus, if the binary coded number corresponding to a particular one of bistable devices 140–1 . . . 140–L is stored in only a single time slot of each successive time frame, the message associated with that particular bistable device will be applied to only a single outgoing line, namely, that outgoing line whose corresponding AND gate 146–1 . . . 146–M is opened in the same time slot as the AND gate 142–1 . . . 142–L corresponding to that particular bistable device 140–1 . . . 140–L is opened. However, if the binary coded number corresponding to a particular one of bistable devices 140–1 . . . 140–L is stored in each of several different time slots of each successive time frame, then the message associated with that particular bistable device will be applied to a plurality of outgoing lines, namely, those outgoing lines whose corresponding AND gates 146–1 . . . 146–M are opened during any of the same time slots as the AND gates 142–1 . . . 142–L corresponding to that particular bistable device 140–1 . . . 140–L is opened.

Thus, any one of bistable devices 140–1 . . . 140–L, by storing individual bits from a single message for an entire time frame, is capable of applying each stored bit during any one or more time slots that occur during the time frame in which that bit is stored to any one or more selected outgoing lines. Therefore, any of a plurality of messages stored in time division multiplex form may be applied to a plurality of different outgoing lines with only a single reading of the message being necessary.

FIG. 1 shows a generalized embodiment of the invention. In practice, L, the number of bistable devices, will normally be the smaller of N, the number of time slots available, or M, the number of outgoing lines. If L equals N, it is possible to eliminate bistable input store and matrix 116 and substitute a simple commutator having N positions, which commutator may be stepped by the slot counter of slot and sector counter and control 112. If L is equal to M, where M is less than N, line store and matrix 120 may be eliminated and there may be substituted therefor a simple commutator having M control positions and a home or ineffective position, which commutator may be stepped by the first M counts of the slot and sector counter and control 112.

Although only a preferred embodiment of the invention has been described herein, it is not intended that the invention be restricted thereto but that it be limited only by the true spirit and scope of the appended claims.

What is claimed is:

1. A switching system for transmitting messages over a plurality of output lines comprising (a) message storage means divided into a number of repetitive sectors having a plurality of time slots, each said sector corresponding to a time frame with predetermined time slots selected from each said sector composing a message, (b) a plurality of bistable devices, (c) first selection means for applying selected information bits from selected time slots composing a message to a selected one of said bistable devices, and (d) second selection means for applying the output of said selected bistable device to selected output lines so that each said selected output line will transmit the same message.

2. The invention as set forth in claim 1 wherein said first selection means comprises a first transmission highway and a plurality of first AND gate means coupling said first highway to said bistable devices and said message storage means and means for enabling selected ones of said first gate means for applying said selected bits from selected time slots to said selected bistable devices.

3. The invention as set forth in claim 2 wherein said second selection means comprises a second transmission highway and a plurality of second AND gate means coupling said second highway to said bistable devices and said output lines and means for applying the output of said selected bistable device to said selected output lines.

4. The invention as set forth in claim 3 wherein said plurality of output devices are at least equal in number to the smallest number of output lines or stored messages.

5. The invention as set forth in claim 4 wherein said storage means is a magnetic drum.

6. In a telegraph message switching center including M outgoing lines each having a line circuit, where M is a plural integer, and a time division multiplex message store capable of storing individual binary bits composing each of a group of N messages in a separate preselected time slot of successive time frames each consisting of N time slots, where N is a plural integer, the combination therewith of apparatus for applying any of said N messages to any predetermined number of preselected outgoing lines, said apparatus comprising a plurality of bistable devices at least equal in number to the smaller of M and N, an input transmission highway, normally closed store gate means coupling said store to said input transmission highway for applying stored message bits to said highway in response to the opening of said store gate means, individual normally closed input gates each of which couples said input transmission highway to the input of a different one of said bistable devices for controlling the state of a bistable device in accordance with the binary value of a message bit on said input transmission highway in response to the opening of the individual input gate coupled to that bistable device, input control means for opening said store gate means at least during a given time slot of each successive time frame and for simultaneously opening the input gate coupled to a particular one of said bistable devices only during said given time slot of each successive time frame, an output transmission highway, individual normally closed output gates each of which couples the output of a different one of said bistable devices to said output transmission highway for applying a sample of the state of a bistable device to said output transmission highway in response to the opening of the individual output gate coupled to that bistable device, individual normally closed line gates each of which couples the output transmission highway to the line circuit of a different one of said outgoing lines, and output control means for opening the output gate coupled to said particular bistable device during a number of predetermined time slots of each successive time frame equal to said predetermined number of preselected outgoing lines and for simultaneously opening the line gate coupled to each preselected line during a different single one of the time slots of each successive time frame during which the output gate coupled to said particular bistable device is opened.

7. The combination defined in claim 6, wherein said predetermined number is a plural number.

8. The combination defined in claim 6, wherein said input control means opens said store gate means during a second given time slot of each successive time frame and the input gate coupled to a second particular bistable device is simultaneously opened only during said second given time slot of each successive time frame, and wherein said output control means opens the output gate coupled to said second particular bistable device during at least one given time slot of each successive time frame other than said predetermined time slots during which the output gate coupled to said first-mentioned particular bistable device is opened and simultaneously opens the line gate coupled to each of certain outgoing lines other than said preselected outgoing lines during a different single one of the time slots of each successive time frame during which the output gate coupled to said second particular bistable device is opened.

References Cited

UNITED STATES PATENTS

| | | |
|---|---|---|
| 3,154,771 | 10/1964 | David et al. |
| 3,311,707 | 3/1967 | Urquhart-Pullen. |

ROBERT L. GRIFFIN, *Primary Examiner.*

JOHN W. CALDWELL, *Examiner.*

J. T. STRATMAN, *Assistant Examiner.*